S. A. Bailey,
Wringer Roll.
N° 35,072. Patented Apr. 29, 1862.
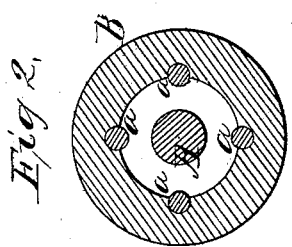
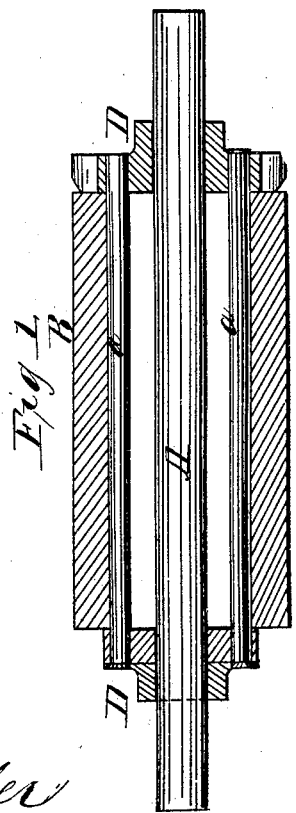
Witnesses,
C. A. Alexander
A. A. Yeatman,
Inventor,
S. A. Bailey

UNITED STATES PATENT OFFICE.

S. A. BAILEY, OF NEW LONDON, CONNECTICUT.

IMPROVED WRINGING-MACHINE CYLINDER.

Specification forming part of Letters Patent No. 35,072, dated April 29, 1862.

*To all whom it may concern:*

Be it known that I, S. A. BAILEY, of New London, county of New London, and State of Connecticut, have invented certain new and useful Improvements in Cylinders for Wringing-Machines; and I do hereby declare that the following is a full, clear, and exact description of the same, reference being had to the accompanying drawing, and to the letters of reference marked thereon.

In the annexed drawing, making part of this specification, A represents a metal shaft, which is provided near one end with a circular metallic plate, D, and near the other with a cog-wheel, D'.

$a\ a$ represent metallic rods which pass through, and which are secured in the plate D at one end and in the cog-wheel at their other. These rods may be four or more in number.

B represents an india-rubber cylinder, which is hollow and which passes on over the rods, as shown in the figure. The rubber B is put on very tight, so that the rods press or embed themselves in it, as seen. The great difficulty with the cylinders of wringing-machines when covered with rubber is that the rubber cannot be kept in place, but will turn upon the shaft, and thus fail to answer the purpose for which it is designed, and then the rubber turning will rapidly break and wear out. The use of the rods $a\ a$ in this manner obviates this difficulty and securely stations the rubber in its proper place.

Having thus fully described my invention, what I claim as new, and desire to secure by Letters Patent, is—

The employment of the rods $a\ a\ a\ a$, in combination with the shaft A and rubber cylinder B, for the purpose of securing the rubber and preventing it from turning during the operation of wringing, as is herein fully set forth.

S. A. BAILEY.

Witnesses:
 DANIEL ROGERS,
 M. J. CARROLL.